(12) United States Patent
Carlson et al.

(10) Patent No.: US 6,980,709 B2
(45) Date of Patent: Dec. 27, 2005

(54) POLYMERIC MATERIAL WITH VOIDS THAT COMPRESS TO ALLOW THE POLYMERIC MATERIAL TO ABSORB APPLIED FORCE AND DECREASE REACTION FORCE TO ONE OR MORE SENSOR FIBERS

(75) Inventors: Kurt R. Carlson, Simi Valley, CA (US); Kristin C. Cooley, Sherman Oaks, CA (US); John P. Rahn, West Hills, CA (US); Manfred Schiruska, Woodland Hills, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 10/600,985

(22) Filed: Jun. 20, 2003

(65) Prior Publication Data

US 2005/0008279 A1 Jan. 13, 2005

(51) Int. Cl.[7] ............................................. G02B 6/04
(52) U.S. Cl. ........................ 385/12; 385/100; 242/173
(58) Field of Search .............................. 385/12, 13, 47, 385/85, 100, 114, 115, 121; 242/160.4, 173; 356/459–460; 521/50

(56) References Cited

U.S. PATENT DOCUMENTS

| | | | |
|---|---|---|---|
| 5,371,593 A | | 12/1994 | Cordova et al. |
| 5,444,534 A | * | 8/1995 | Dyott et al. ............... 356/465 |
| 5,546,482 A | * | 8/1996 | Cordova et al. ............ 385/12 |
| 5,675,686 A | * | 10/1997 | Rosenmayer et al. ....... 385/114 |
| 5,742,390 A | * | 4/1998 | Cordova et al. ............ 356/465 |
| 5,869,164 A | * | 2/1999 | Nickerson et al. ........... 428/76 |
| 6,054,068 A | | 4/2000 | Carlson et al. |
| 6,509,959 B1 | | 1/2003 | Carlson et al. |
| 2001/0000930 A1 | * | 5/2001 | Kim .......................... 264/1.24 |

FOREIGN PATENT DOCUMENTS

| | | | |
|---|---|---|---|
| DE | 28 54 581 | | 6/1980 |
| EP | 0 660 082 | * | 6/1995 ............ G01C 19/72 |
| EP | 0 752 603 | | 1/1997 |
| EP | 1 398 654 | | 3/2004 |

* cited by examiner

Primary Examiner—Brian Healy
Assistant Examiner—Christopher M. Kalivoda
(74) Attorney, Agent, or Firm—Patti & Brill, LLC

(57) ABSTRACT

In one example, the voids 208 comprise one or more gas (e.g., air) bubbles in the solid material 206. In another example, the voids 208 comprise a structure that preserves a space in the solid material 206. In a further example, the voids 208 comprise hollow elastomeric bubbles, for example, hollow elastomeric microspheres. The hollow elastomeric microspheres comprise microballoons with tin walls that encapsulate a gas to allow for easy compression. For example, the walls of the hollow elastomeric microspheres are strong enough to avoid breakage under pressure, but thin enough to easily compress. In a further example, once cured in the solid material 206, the hollow elastomeric microspheres comprise substantially similar compressibility characteristics as gas bubbles. The voids 208 in one example are added to a resin of the solid material 206 in a substantially uniform distribution. For example, the hollow elastomeric microspheres are stirred into the resin of the solid material 206.

41 Claims, 2 Drawing Sheets

POLYMERIC MATERIAL WITH VOIDS THAT COMPRESS TO ALLOW THE POLYMERIC MATERIAL TO ABSORB APPLIED FORCE AND DECREASE REACTION FORCE TO ONE OR MORE SENSOR FIBERS

CROSS-REFERENCE TO RELATED APPLICATION

This application contains subject matter which is related to the subject matter of the following application, which is assigned to the same assignee as this application. The below-listed application is hereby incorporated herein by reference in its entirety:

"INTRODUCING VOIDS INTO POLYMERIC MATERIAL FOR BUFFERING ONE OR MORE STRESS SENSITIVE COMPONENTS FROM ONE OR MORE STRESSES," by Carlson, et al., co-filed herewith.

TECHNICAL FIELD

The invention relates generally to sensor fibers and more particularly to buffering sensor fibers.

BACKGROUND

Polymeric materials in one example are used for buffering sensor fibers. For example, the polymeric material coats the sensor fiber for protection of the sensor fiber. In one example, the polymeric material comprises a potting compound and the sensor fiber comprises an optical fiber. The potting compound comprises a buffer layer for the optical fiber. The optical fiber is wound about a spool in a winding pattern to form a fiber optic coil. A fiber optic gyroscope in one example employs the fiber optic coil to sense a rate of rotation. The fiber optic coil comprises a plurality of windings along the length of the spool and one or more layers of windings. As the optical fiber is wound about the spool, the potting material is applied to the outer surface of the optical fiber. For example, a syringe and brush applicator coats the fiber optic coil with the potting material. The potting material promotes precision in the winding pattern of the fiber optic coil.

The potting compound in one example fills a space between each of the windings and the layers of windings. For example, the potting compound acts a buffer layer between each of the windings and the layers of windings. Upon expansion of the fiber optic coil, the fiber optic coil applies a force on the potting compound. The potting compound has a high bulk modulus. Thus, in response to the applied force the potting compound applies a reaction force on the fiber optic coil. The reaction force applies a pressure, stress, and/or strain on the fiber optic coil. As one shortcoming, the applied pressure, stress, and/or strain on the fiber optic coil may promote a decrease in performance of the fiber optic coil. For example, the rotation measurement of the fiber optic coil for the fiber optic gyroscope may experience a greater bias error due to the applied pressure, stress, and/or strain.

Thus, a need exists for a polymeric material that absorbs a larger portion of an applied force from a sensor fiber. A further need exists for a polymeric material that promotes a decrease in reaction pressure, stress, and/or strain applied to a sensor fiber.

SUMMARY

The invention in one embodiment encompasses an apparatus. The apparatus in one example comprises a polymeric material that abuts one or more sensor fibers. The polymeric material comprises a plurality of voids. Upon an introduction of an applied force to a portion of the polymeric material, one or more of the plurality of voids compress to allow the portion of the polymeric material to absorb a portion of the applied force and promote a decrease of a reaction force from the portion of the polymeric material to one or more of the one or more sensor fibers.

Another embodiment of the invention encompasses an apparatus. The apparatus in one example comprises a fiber optic sensing coil of a fiber optic gyroscope. One or more portions of the fiber optic sensing coil are coated with a potting material that comprises a plurality of voids. Upon contact with the fiber optic sensing coil, the plurality of voids compress to promote a decrease in a strain on the fiber optic sensing coil. The decrease in the strain on the fiber optic sensing coil promotes a decrease in a bias error of the fiber optic sensing coil.

Yet another embodiment of the invention encompasses a method. One or more sensor fibers in abutment with a polymeric material are buffered through employment of a portion of the polymer material that comprises a plurality of voids to absorb a portion of an applied force. Compression of one or more of the plurality of voids is accommodated in response to the applied force to promote a decrease in a reaction force from the polymeric material to one or more of the one or more sensor fibers.

DESCRIPTION OF THE DRAWINGS

Features of exemplary implementations of the invention will become apparent from the description, the claims, and the accompanying drawings in which:

DETAILED DESCRIPTION

Figure 1:
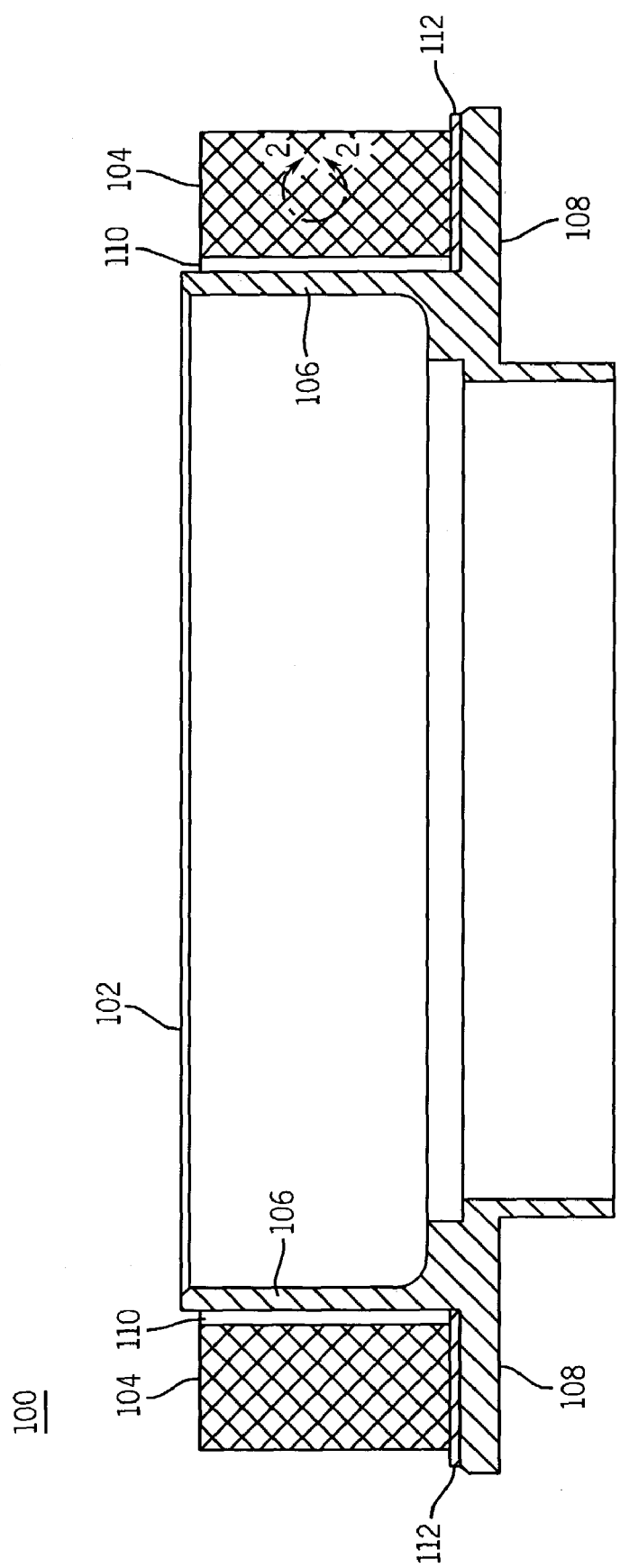
FIG. 1 is a sectional representation of one exemplary implementation of an apparatus that comprises one or more spools and one or more sensor fiber coils.

Turning to FIG. 1, an apparatus 100 in one example comprises a plurality of components such as hardware components. A number of such components can be combined or divided in one example of the apparatus 100. The apparatus 100 in one example comprises any (e.g., horizontal, oblique, or vertical) orientation, with the description and figures herein illustrating one exemplary orientation of the apparatus 100, for explanatory purposes.

The apparatus 100 in one example comprises one or more spools 102 and one or more sensor fiber coils 104. For example, the apparatus 100 comprises a sensing component of a fiber optic gyroscope. The fiber optic gyroscope in one example comprises a light source, a beam splitter, the sensor fiber coil 104, and processing electronics. Light from the light source is split by the beam splitter into two counter-propagating waves traveling through the sensor fiber coil 104. The processing electronics measure a phase relationship between the two counter-propagating beams of light that emerge from opposite ends of the sensor fiber coil 104. The difference between the phase shifts experienced by the two beams is proportional to the rate of rotation of the fiber optic gyroscope, due to the Sagnac effect, as will be understood by those skilled in the art.

The spool 102 provides a support structure for the sensor fiber coil 104. The spool 102 comprises a hub 106 and a flange 108. The hub 106 in one example comprises a solid or hollow cylindrical member. The flange 108 comprises a rim at an end of the hub 106. The diameter of the flange 108 is larger than the diameter of the hub 106. The hub 106 and the flange 108 in one example comprise a rigid material such as steel. In a further example, the hub 106 and the flange 108 comprise a unitary construction and/or integral formation.

In one example, the hub 106 and the flange 108 directly support the sensor fiber coil 104. In another example, buffer layers 110 and 112 support the sensor fiber coil 104. The buffer layer 110 is located on the hub 106 and the buffer layer 112 is located on the flange 108. For example, the buffer layer 110 is located between the hub 106 and the sensor fiber coil 104 and the buffer layer 112 is located between the flange 108 and the sensor fiber coil 104. The buffer layers 110 and 112 comprise compressible and/or resilient layers. For example, the buffer layers 110 and 112 comprise a polymeric material, such as a potting compound. The buffer layer 110 in one example comprises a coating on the hub 106. The buffer layer 112 in one example comprises a coating on the flange 108. The buffer layers 110 and 112 serve to promote a decrease in strain and strain gradients in the sensor fiber coil 104.

The buffer layers 110 and 112 in one example are applied to the spool 102 before the sensor fiber coil 104 is wound about the hub 106. For example, the buffer layers 110 and 112 are applied to the spool 102 in a liquid or paste form. Next, the buffer layers 110 and 112 are preserved and/or finished. For example, the buffer layers 110 and 112 are cured. In another example, the buffer layers 110 and 112 are pre-formed and then applied to the spool 102.

Figure 2:
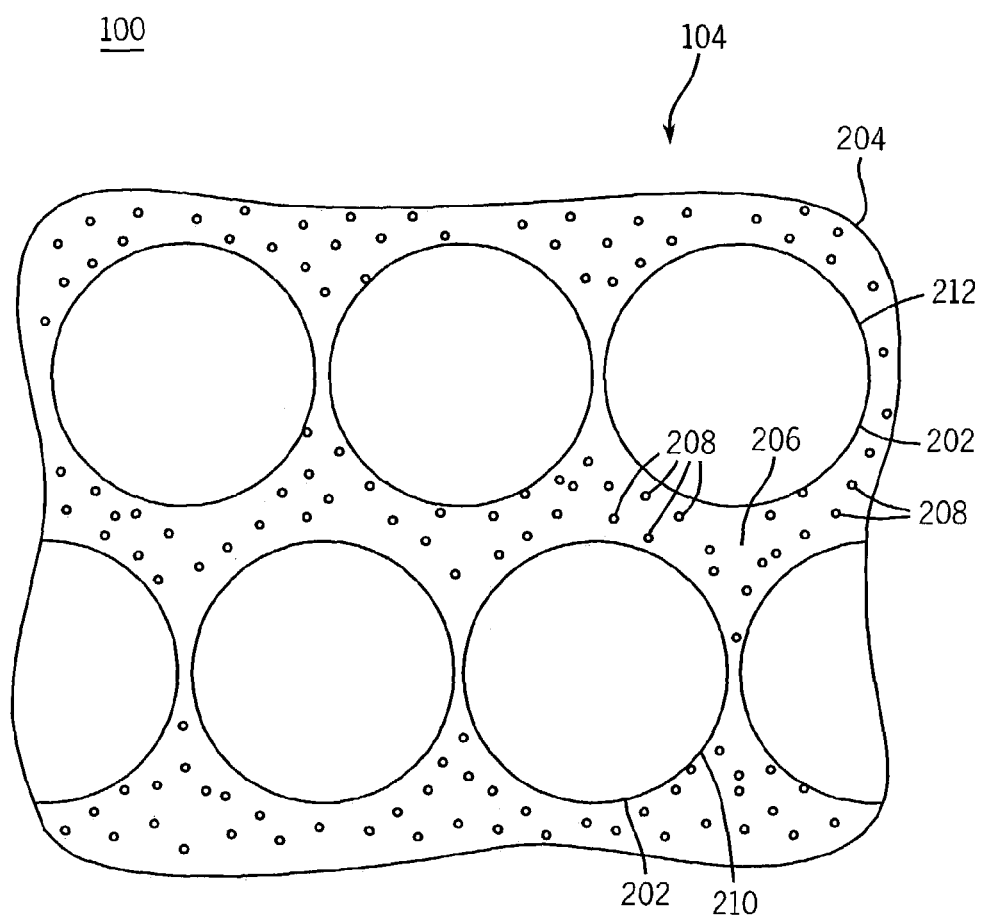
FIG. 2 is a sectional representation of the sensor fiber coil directed along line 2—2 of FIG. 1.

Turning to FIGS. 1 and 2, the sensor fiber coil 104 in one example comprises one or more sensor fibers 202 and a polymeric material 204. For example, the one or more sensor fibers 202 comprise one or more stress sensitive components and the polymeric material 204 buffers the stress sensitive components from one or more stresses. The sensor fiber 202 in one example comprises an optical path or waveguide for propagation of light. The sensor fiber 202 comprises a relatively high thermal expansion coefficient. During thermal increases, the sensor fiber 202 expands. During thermal decreases, the sensor fiber 202 contracts. The expansions and/or contractions exert circumferential strain on a glass core of the sensor fiber 202.

The sensor fiber 202 is wound about the hub 106, for example, in one or more layers. Each layer in one example is located at a respective approximate distance outward from the hub 106. For example, a first layer is wound directly on the hub 106. In another example, the first layer is wound onto the buffer layer 110 atop the hub 106. Subsequent layers are wound about the first layer. The sensor fiber coil 104 in one example comprises a quadrapole-winding pattern. In another example, the sensor fiber coil 104 comprises a dipole-winding pattern, as will be understood by those skilled in the art.

The polymeric material 204 in one example comprises a carbon filled silicon material or a silver filled silicon material. For example, the polymeric material 204 comprises a potting compound. The polymeric material 204 serves to bond together turns of the sensor fiber coil 104. As the sensor fiber 202 is wound about the spool 102, the polymeric material 204 is applied to the outer surface of the sensor fiber 202. For example, a syringe and brush applicator coats the sensor fiber 202 with the polymeric material 204. The polymeric material 204 serves to hold the sensor fiber coil 104 as a wound unit about the spool 102. For example, the polymeric material 204 is located between adjacent portions of the sensor fiber 202.

The polymeric material 204 comprises a solid material 206 and a plurality of voids 208. The voids 208 fill a controlled volume percentage of the polymeric material 204. The voids 208 in one example fill up to twenty-five percent of the total volume of the polymeric material 204. In a further example, the voids 208 fill ten percent of the total volume of the polymeric material 204. An introduction of the voids 208 into the polymeric material 204 reduces the density of the polymeric material 204. The introduction of the voids 208 into the polymeric material 204 also promotes a decrease in a bulk modulus of the polymeric material 204. In a further example, the introduction of the voids 208 into the polymeric material 204 promotes the decrease in the bulk modulus without substantially altering a Young's modulus of the polymeric material 204. The bulk modulus ("B") of the polymeric material 204 is defined by the following exemplary equation:

$$B = V(dP/dV)$$

Where "V" represents the volume of the polymeric material 204.

Where "P" represents the external pressure.

The ratio of bulk modulus ("B") to Young's modulus ("E") of the polymeric material 204 is defined by the following exemplary equation:

$$B/E = 1/[3(1-2\rho)]$$

Where "ρ" represents the Poisson's ratio.

In one example, the polymeric material 204 with the voids 208 has a lower Poisson's ratio than the solid material 206 without voids. Since the voids 208 do not substantially alter the Young's modulus of the solid material 206, then it follows that a decrease in the Poisson's ratio results in a decrease in the bulk modulus of the polymeric material 204. Thus, in one example a decrease in the Poisson's ratio from 0.499 to 0.490 results in a decrease in the ratio of bulk modulus to Young's modulus by a factor of ten.

The bulk modulus of a solid polymer in one example is substantially greater than the bulk modulus of a gas. For example, the bulk modulus of the solid polymer may be ten thousand times greater than the bulk modulus of the gas. Also, thermal pressure coefficients of the solid polymer in one example are substantially greater than the thermal pressure coefficients of the gas. For example, the thermal pressure coefficients of the solid polymer may be three thousand times greater than the thermal pressure coefficients of the gas. Thus, a controlled amount of the voids 208 in the polymeric material 204 decreases the bulk modulus and thermal pressure coefficient of the polymeric material 204.

In one example, the voids 208 comprise one or more gas (e.g., air) bubbles in the solid material 206. In another example, the voids 208 comprise a structure that preserves a space in the solid material 206. In a further example, the voids 208 comprise hollow elastomeric bubbles, for example, hollow elastomeric microspheres. The hollow elastomeric microspheres comprise microballons with thin walls that encapsulate a gas to allow for easy compression. For example, the walls of the hollow elastomeric microspheres are strong enough to avoid breakage under pressure, but thin enough to easily compress. In a further example, once cured in the solid material 206, the hollow elastomeric microspheres comprise substantially similar compressibility characteristics as gas bubbles. The voids 208 in one example are added to a resin of the solid material 206 in a substantially uniform distribution. For example, the hollow elastomeric microspheres are stirred into the resin of the solid material 206.

A coupling agent in one example is used to increase an adhesion between the hollow elastomeric microspheres and the solid material 206. The coupling agent in one example comprises organofunctional reactive silane. The coupling agent also promotes a decrease in a rate of settling of the hollow elastomeric microspheres in the solid material 206. For example, the coupling agent maintains the substantially uniform distribution of the hollow elastomeric microspheres in the solid material 206. The solid material 206 and the voids 208 are cured to maintain the substantially uniform distribution of the voids 208 within the solid material 206.

The voids 208 comprise a diameter that is smaller than a distance of separation between adjacent portions 210 and 212 of the sensor fiber 202. For example, one or more of the voids 208 fit between the adjacent portions 210 and 212 of the sensor fiber 202. The voids 208 in one example comprise the hollow elastomeric microspheres with a diameter that is small enough to fit between the adjacent portions 210 and 212 of the sensor fiber 202. For example, in one implementation the diameter of the voids 208 of the sensor fiber coil 104 for the fiber optic gyroscope is less than fifty micrometers. In a further example, the diameter of the hollow elastomeric microspheres is twelve micrometers.

In one example, the voids 208 reserve space in the solid material 206 to increase a compressibility of the polymeric material 204. For example, the voids 208 promote an increase in an amount of an applied force the polymeric material 204 can absorb. Upon an introduction of the applied force to a portion of the polymeric material 204, one or more of the voids 208 compress to allow the portion of the polymeric material 204 to absorb a portion of the applied force. For example, the applied force pushes a portion of the solid material 206 into the space previously reserved by the voids 208. The voids 208 also promote a decrease of a reaction force generated by the portion of the polymeric material 204 in response to the applied force. Since the voids 208 allow the polymeric material 204 to absorb a larger portion of the applied force, the magnitude of the reaction force from the polymeric material 204 is decreased.

In one example, as the temperature of the sensor fiber coil 104 increases, one or more of the sensor fiber 202 and the polymeric material 204 expand. Due to the expansion, the sensor fiber 202 exerts a thermal pressure on the polymeric material 204 and the polymeric material 204 exerts a thermal pressure on the sensor fiber 202. The voids 208 compress to promote a decrease in the thermal pressure that the polymeric material 204 exerts on the sensor fiber 202. For example, when the polymeric material 204 expands, the solid material 206 expands into the space previously reserved by the voids 208 rather than adding to the thermal pressure that the polymeric material 204 exerts on the sensor fiber 202.

Contact between the sensor fiber 202 and the polymeric material 204 in one example introduces a stress, strain, stress gradient, and/or strain gradient in the sensor fiber 202. The stress and/or strain may degrade the performance of the sensor fiber 202. For example, the stress and/or strain may reduce the polarization maintaining properties of the sensor fiber 202. The voids 208 compress to promote a decrease in the magnitude of any stress, strain, stress gradient, and/or strain gradient applied by the polymeric material 204 to the sensor fiber 202.

In one example, the polymeric material 204 encapsulates the sensor fiber 202 for the fiber optic gyroscope. The compression of the voids 208 promotes a decrease in measurement bias errors of the fiber optic gyroscope. For example, the decrease in the magnitude of the stress, strain, stress gradient, and/or strain gradient applied by the polymeric material 204 to the sensor fiber 202 promotes an increase in accuracy and a decrease in the rotation sensing bias error of the fiber optic gyroscope. The compression of the voids 208 promotes a decrease in a Shupe coefficient of the fiber optic gyroscope.

In another example, the polymeric material 204 encapsulates one or more electrical components, for example, electronic and optical sensor equipment. A power supply in one example employs the polymeric material 204 as a potting compound for the electrical components. The voids 208 of the polymeric material 204 in one example compress under pressure to avoid structural failure to one of the electrical components such as a glass-bodied diode. The reduced bulk modulus and increased compressibility of the polymeric material 204 due to the voids 208 are advantages for electrical component encapsulation. For example, the reduced bulk modulus and increased compressibility of the polymeric material 204 promotes a decrease in likelihood that contact with the polymeric material 204 will damage the electrical components. In one example, the polymeric material 204 encapsulates an optical coupler. The reduced bulk modulus of the polymeric material 204 allows for complete coverage of the optical coupler with the polymeric material 204. An acoustic sensor in one example employs the polymeric material 204 to buffer an optical fiber from a sensing component. For example, the reduced bulk modulus of the polymeric material 204 promotes a decrease in an amount of acoustic noise that reaches the optical fiber.

In yet another example, the polymeric material 204 with the plurality of voids 208 is used to create the buffer layers 110 and 112. For example, the buffer layers 110 and 112 comprise the plurality of voids 208. As a further example, the polymeric material 204 of the sensor fiber coil 104 and the buffer layers 110 and 112 are made from substantially the same material. Thus, the reduced bulk modulus and increased compressibility characteristics of the polymeric material 204, described herein, are substantially similar to the bulk modulus and compressibility characteristics of the buffer layers 110 and 112 that comprise the plurality of voids 208. The plurality of voids 208 in the buffer layers 110 and 112 promote a decrease in contact forces between the spool 102 and the sensor fiber coil 104.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. An apparatus, comprising:
   a polymeric potting material that encapsulates a fiber optic sensing coil, wherein the fiber optic sensing coil comprises a first coil portion and a second coil portion, wherein the first coil portion is adjacent to the second coil portion, wherein the polymeric potting material comprises a plurality of introduced voids that promote an increase in compressibility of the polymeric potting material, wherein one or more of the plurality of introduced voids are located between the first coil portion and the second coil portion;

wherein upon an introduction of an applied force to a portion of the polymeric potting material, one or more of the one or more of the plurality of introduced voids compress to allow the portion of the polymeric potting material to absorb a portion of the applied force and promote a decrease of a reaction force from the portion of the polymeric potting material to the fiber optic sensing coil.

2. The apparatus of claim 1, wherein the compression of the one or more of the plurality of voids promotes a decrease in strain of the fiber optic sensing coil due to contact with the polymeric potting material.

3. The apparatus of claim 1, wherein the plurality of introduced voids in the polymeric potting material promote a decrease in a bulk modulus of the polymeric potting material.

4. The apparatus of claim 1, wherein upon a change in temperature, the plurality of introduced voids in the polymeric potting material promote a decrease in a thermal pressure induced on the fiber optic sensing coil by the polymeric potting material.

5. The apparatus of claim 1, wherein the portion of the polymeric potting material separates the first coil portion and the second coil portion, wherein the portion of the polymeric potting material comprises the one or more of the plurality of voids;

wherein the one or more of the one or more of the plurality of introduced voids compress to allow the portion of the polymeric potting material to absorb the portion of the applied force from one or more of the first coil portion and the second coil portion.

6. The apparatus of claim 5, wherein the one or more of the one or more of the plurality of introduced voids compress to promote the decrease of the reaction force from the portion of the polymeric potting material to the first coil portion, wherein the reaction force is generated in response to the applied force from the second coil portion.

7. The apparatus of claim 5, wherein the one or more of the one or more of the plurality of introduced voids compress to promote the decrease of the reaction force from the portion of the polymeric potting material to the first coil portion, wherein the reaction force is generated in response to the applied force from the first coil portion.

8. The apparatus of claim 5, wherein upon an expansion of the fiber optic sensing coil, the first coil portion and the second coil portion exert the applied force on the portion of the polymeric potting material;

wherein the one or more of the one or more of the plurality of introduced voids compress to promote a decrease of strain in the first coil portion and the second coil portion due to contact with the portion of the polymeric potting material.

9. The apparatus of claim 5, wherein first coil portion and the second coil portion comprise adjacent layers of the fiber optic sensing coil, wherein the first coil portion and the second coil portion are separated by a distance;

wherein the one or more of the plurality of introduced voids in the portion of the polymeric potting material comprise a diameter that is smaller than the distance.

10. The apparatus of claim 1, wherein a distribution of the plurality of introduced voids is substantially uniform within the polymeric potting material.

11. The apparatus of claim 1, wherein a fiber optic gyroscope comprises the fiber optic sensing coil, wherein the fiber optic sensing coil senses a rate of rotation for the fiber optic gyroscope.

12. The apparatus of claim 11, wherein the compression the one or more of the one or more of the plurality of introduced voids promotes a decrease in a rotation sensing bias error of the fiber optic gyroscope through promotion of a decrease in a pressure exerted on the fiber optic sensing coil by the polymeric potting material.

13. The apparatus of claim 1, wherein the plurality of introduced voids comprise a plurality of hollow elastomeric microspheres.

14. The apparatus of claim 1, wherein the plurality of introduced voids comprise a plurality of hollow elastomeric microballons, wherein the plurality of hollow elastomeric microballons comprise thin polymer walls that encapsulate a gas to allow for compression of the plurality of hollow elastomeric microballons.

15. The apparatus of claim 14, wherein the thin polymer walls of the plurality of hollow elastomeric microballoons preserve a volume within the polymeric potting material;

wherein upon the introduction of the applied force to the portion of the polymeric potting material, the thin polymer walls of the plurality of hollow elastomeric microballoons compress to reduce the volume of the plurality of hollow elastomeric microballoons and absorb a portion of the applied force.

16. The apparatus of claim 14, wherein a coupling agent serves to adhere the thin polymer walls of the plurality of hollow elastomeric microballoons with a resin of the polymeric potting material.

17. The apparatus of claim 1, wherein the fiber optic sensing coil comprises a plurality of layers of a fiber optic cable wound about a spool;

wherein the polymeric potting material with the plurality of introduced voids holds together the plurality layers of the fiber optic sensing coil as a wound unit.

18. The apparatus of claim 17, wherein the polymeric potting material holds a position of a first layer of the plurality layers relative to an adjacent layer of the plurality layers in the wound unit;

wherein the plurality of voids within the polymeric potting material serve to promote compressibility of the polymeric potting material that holds the position of the first layer relative to the adjacent layer.

19. The apparatus of claim 1, wherein the polymeric potting material comprises:

one or more naturally occurring voids; and the plurality of introduced voids;

wherein the plurality of introduced voids serve to fill a controlled volume percentage of the polymeric potting material.

20. The apparatus of claim 19, wherein the one or more naturally occurring voids are inherent in the polymeric potting material and the plurality of introduced voids are intentionally added into the polymeric potting material;

wherein the controlled volume percentage comprises five to twenty-five percent of the polymeric potting material.

21. The apparatus of claim 1, wherein the first coil portion comprises a first layer of the fiber optic sensing coil, wherein the second coil portion comprises a second layer of the fiber optic sensing coil;

wherein the one or more of the plurality of introduced voids are located between the first layer and the second layer.

22. The apparatus of claim 1, wherein the fiber optic sensing coil comprises a layer of a plurality of optical fiber windings, wherein the first coil portion comprises a first optical fiber winding of the plurality of optical fiber windings, wherein the second coil portion comprises a second optical fiber winding of the plurality of optical fiber windings;

wherein the one or more of the plurality of introduced voids are located between the first winding and the second winding.

23. An apparatus, comprising:

a fiber optic sensing coil of a fiber optic gyroscope, wherein the fiber optic sensing coil comprises a first coil portion and a second coil portion, wherein the first coil portion is adjacent to the second coil portion; and a potting material that encapsulates the fiber optic sensing coil, wherein the potting material comprises a plurality of introduced voids that promote an increase in compressibility of the polymeric potting material, wherein one or more of the plurality of introduced voids are located between the first coil portion and the second coil portion;

wherein upon contact between the fiber optic sensing coil and the potting material, one or more of the one or more of the plurality of introduced voids compress to promote a decrease in a strain on the fiber optic sensing coil, wherein the decrease in the strain on the fiber optic sensing coil promotes a decrease in a bias error of the fiber optic sensing coil.

24. The apparatus of claim 23, wherein the fiber optic sensing coil comprises one or more optical fibers wound about a spool in a plurality of layers, wherein the first coil portion comprises a first layer of the plurality of layers, wherein the second coil portion comprises a second layer of the plurality of layers; wherein a portion of the potting material comprises a buffer between the first layer and the second layer;

wherein the portion of the potting material comprises the one or more of the plurality of introduced voids, wherein the one or more of the plurality of voids promote a decrease in pressure exerted between the first layer and the second layer.

25. The apparatus of claim 23, wherein the plurality of introduced voids comprise a plurality of hollow elastomeric microballoons, wherein the plurality of hollow elastomeric microballoons comprise thin polymer walls that encapsulate a gas to allow for compression of the plurality of hollow elastomeric microballoons.

26. The apparatus of claim 23, wherein the fiber optic sensing coil comprises a plurality of layers of a fiber optic cable wound about a spool;

wherein the polymeric potting material with the plurality of introduced voids holds together the plurality layers of the fiber optic sensing coil as a wound unit;

wherein the polymeric potting material holds a position of a first layer of the plurality layers relative to an adjacent layer of the plurality layers in the wound unit;

wherein the plurality of voids within the polymeric potting material serve to promote compressibility of the polymeric potting material that holds the position of the first layer relative to the adjacent layer.

27. The apparatus of claim 23, wherein the polymeric potting material comprises:

one or more naturally occurring voids; and
the plurality of introduced voids;

wherein the plurality of introduced voids serve to fill a controlled volume percentage of the polymeric potting material.

28. The apparatus of claim 27, wherein the one or more naturally occurring voids are inherent in the polymeric potting material and the plurality of introduced voids are intentionally added into the polymeric potting material;

wherein the controlled volume percentage comprises five to twenty-five percent of the polymeric potting material.

29. A method, comprising the steps of:

encapsulating a fiber optic sensing coil within a polymeric potting material that comprises a plurality of introduced voids that promote an increase in compressibility of the polymeric potting material to absorb a portion of an applied force, wherein the fiber optic sensing coil comprises a first coil portion and a second coil portion, wherein the first coil portion is adjacent to the second coil portion, wherein one or more of the plurality of introduced voids are located between the first coil portion and the second coil portion; and accommodating compression of one or more of the one or more of the plurality of introduced voids in response to the applied force to promote a decrease in a reaction force from the polymeric potting material to the fiber optic sensing coil.

30. The method of claim 29, wherein the step of encapsulating the fiber optic sensing coil within the polymeric potting material that comprises the plurality of introduced voids that promote the increase in compressibility of the polymeric potting material to absorb the portion of the applied force comprises the steps of:

applying the polymeric potting material to a sensor fiber contemporaneously with winding the sensor fiber into the fiber optic sensing coil; and buffering the first coil portion from the second coil portion with a portion of the polymeric potting material that comprises the one or more of the plurality of introduced voids.

31. The method of claim 30, wherein upon an expansion of the fiber optic sensing coil, one or more of the first coil portion and the second coil portion exert the applied force on the portion of the polymeric potting material, wherein the step of buffering the first coil portion from the second coil portion with the portion of the polymeric potting material that comprises the one or more of the plurality of introduced voids comprises the step of:

promoting a decrease of strain in one or more of the first coil portion and the second coil portion due to contact with the portion of the polymeric potting material.

32. The method of claim 30, further comprising the steps of:

employing the fiber optic sensing coil as a rate of rotation sensor in a fiber optic gyroscope; and promoting a decrease in a rotation sensing bias error of the fiber optic gyroscope by promoting a decrease in a pressure exerted on the fiber optic sensing coil by the polymeric potting material.

33. The method of claim 29, wherein the step of encapsulating the fiber optic sensing coil within the polymeric potting material that comprises the plurality of introduced voids that promote the increase in compressibility of the polymeric potting material to absorb the portion of the applied force comprises the steps of:

applying the polymeric potting material to one or more support faces of a spool;

winding a sensor fiber around the spool to generate the fiber optic sensing coil; and buffering a coil portion of the fiber optic sensing coil from one or more of the one or more support faces of the spool with a portion of the polymeric potting material that comprises one or more of the plurality of introduced voids.

34. The method of claim 29, wherein the step of accommodating compression of the one or more of the one or more of the plurality of introduced voids in response to the applied force to promote the decrease in the reaction force from the polymeric potting material to the fiber optic sensing coil comprises the step of:

promoting a decrease of strain in the fiber optic sensing coil due to contact with the polymeric potting material.

35. The method of claim 29, wherein the plurality of introduced voids comprise a plurality of hollow elastomeric microballoons, wherein the plurality of hollow elastomeric microballoons comprise thin polymer walls that encapsulate a gas to allow for compression of the plurality of hollow elastomeric microballoons;

wherein the step of encapsulating the fiber optic sensing coil within the polymeric potting material that comprises the plurality of introduced voids that promote the increase in compressibility of the polymeric potting material to absorb the portion of the applied force comprises the steps of:

mixing the plurality of hollow elastomeric microballoons into a resin of the polymeric potting material to create the polymeric potting material with the plurality of introduced voids; and potting substantially all of the fiber optic sensing coil within the polymeric potting material to hold the fiber optic sensing coil as a wound unit.

36. The apparatus of claim 29, wherein the polymeric potting material comprises:

one or more naturally occurring voids; and the plurality of introduced voids;

wherein the plurality of introduced voids serve to fill a controlled volume percentage of the polymeric potting material.

37. The apparatus of claim 36, wherein the one or more naturally occurring voids are inherent in the polymeric potting material and the plurality of introduced voids are intentionally added into the polymeric potting material;

wherein the controlled volume percentage comprises five to twenty-five percent of the polymeric potting material.

38. A method, comprising the steps of:

winding a fiber optic cable about a spool to form a fiber optic sensing coil that comprises a plurality of layers of the fiber optic cable, wherein the plurality of layers of the fiber optic sensing coil comprises a first layer and a second layer;

encapsulating the fiber optic sensing coil within a polymeric potting material that comprises a plurality of introduced voids that promote an increase in compressibility of the polymeric potting material, wherein one or more of the plurality of introduced voids are located between the first layer and the second layer; and employing the polymeric potting material with the plurality of introduced voids to hold together the plurality layers of the fiber optic sensing coil as a wound unit.

39. The method of claim 38, wherein the plurality of introduced voids comprise a plurality of hollow elastomeric microballoons, wherein the plurality of hollow elastomeric microballoons comprise thin polymer walls that encapsulate a gas to allow for compression of the plurality of hollow elastomeric microballoons;

wherein the step of encapsulating the fiber optic sensing coil within the polymeric potting material that comprises the plurality of introduced voids that promote the increase in compressibility of the polymeric potting material comprises the steps of:

mixing the plurality of hollow elastomeric microballoons into a resin of the polymeric potting material to create the polymeric potting material with the plurality of introduced voids; and potting all or substantially all of the fiber optic sensing coil within the polymeric potting material to hold the fiber optic sensing coil as the wound unit.

40. The apparatus of claim 38, wherein the polymeric potting material comprises:

one or more naturally occurring voids; and the plurality of introduced voids;

wherein the plurality of introduced voids serve to fill a controlled volume percentage of the polymeric potting material.

41. The apparatus of claim 40, wherein the one or more naturally occurring voids are inherent in the polymeric potting material and the plurality of introduced voids are intentionally added into the polymeric potting material;

wherein the controlled volume percentage comprises five to twenty-five percent of the polymeric potting material.

* * * * *